June 6, 1967   L. PEMBERTON   3,323,493
BULL CONTROL
Filed April 26, 1966

INVENTOR.
Leonard Pemberton
BY
Peck + Peck
ATTORNEYS

United States Patent Office 3,323,493
Patented June 6, 1967

3,323,493
BULL CONTROL
Leonard Pemberton, Rte. 5, Harrison, Ark. 72601
Filed Apr. 26, 1966, Ser. No. 545,462
1 Claim. (Cl. 119—142)

ABSTRACT OF THE DISCLOSURE

This invention comprises a bull control device in which pain inflicting means is operable on the bull when the bull is butting and combined and co-active therewith is a poke which is operable to cause functioning of said pain inflicting means when the poke is caught on a fence wire, or the like.

---

The invention disclosed in this application constitutes an improvement on the bull control apparatus disclosed in my prior United States Patent No. 3,167,054. This patent discloses a bull control means which is removably fastened to the head of a bull and involves pain producing means which inflict pain upon the bull to cause him to cease the usual butting proclivities which are inherent in such animals. While the bull control of my former patent has proved entirely successful, I have now devised and am disclosing herein an improvement on this original bull control, which improvement broadly embodies additional means on my former bull control device which causes the pain inflicting means disclosed in my aforesaid patent to be operative when the bull attempts to go through or under a wire fence, as well as when he is butting with his head, and this improvement not only actuates the pain inflicting means disclosed in my patent, but it also automatically actuates a further and additional pain inflicting means, there thereby induce sufficient pain in the animal when he attempts to go through or under a wire fence to cause him to cease such activity.

It is to be understood and fully recognized that the improvement which I have devised does not reduce the efficacy of the pain inflicting means disclosed in the aforesaid patent when the bull is butting against another bull, a gate, fence or the like.

One of the significant characteristics of the present invention resides in the fact that the combination butting preventing and fence traversing preventing device are combined together with facility and produce a relatively simple, inexpensive and effective device.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

In the accompanying drawings, I have illustrated my improved bull control device in operative position on the head of a bull, and I have also clearly illustrated the structure and arrangement of the device separated from the bull and in readiness to be applied thereto.

Figure 1:
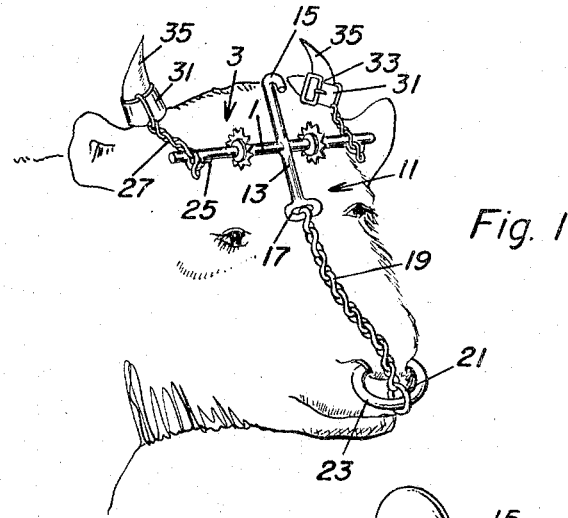
FIG. 1 is a view in perspective of my bull control device in operative position upon the head of a bull.

The bull control device includes what I shall term a transverse rigid rod which I have designated by the numeral 1, and this rod is of a length slightly less than the width of the upper portion or forehead of a bull to which it is to be applied as is clearly illustrated in FIG. 1 of the drawings.

Fixed to the rigid transverse rod 1 is a pair of spaced apart pain inflicting elements which I have designated in their entirety by the numeral 3. Each of these pain inflicting elements is immovably fixed upon the rod 1 by welding or the like and is of generally circular configuration providing a body portion 5 which is formed to provide about the periphery thereof a continuous annulus of outwardly projecting sharpened prongs, spurs or the like 9.

Intermediate the ends of the rigid rod 1, I form what I shall term a vertical fence wire hooking and pain inflicting means which I have designated in its entirety by the numeral 11. This means 11 comprises a vertical rigid rod 13, which extends both above and below the transverse rod 1, and this vertical rod 13 may be integrally formed on the rod 1, or it may be welded or otherwise secured thereto, in position extending above and below the rod 1 in substantially perpendicular relation with respect thereto. At the upper end of the rod 13, a hook 15 is formed, and this hook, when the device is applied to the head of a bull, extends forwardly and outwardly, as is clearly illustrated in FIG. 1 of the drawings. At the lower or opposite end of the vertical rod 13, I form an eye 17 in any suitable manner, and threaded or linked through this eye 17 is a chain, cable, or the like 19, which at its lower end is attached by an annulus 21 to a conventional bull nose ring 23.

Adjacent to but inwardly spaced from each end of the rod 1 is an eye 25 fixed to and depending therefrom, through which is linked or threaded a chain, cable or the like 27 to the lower end of which is fastened a flat link 29 through which a strap 31 is threaded.

In applying the bull control device to the head of a bull, the straps 31, having buckles 33 thereon, are wound about each horn 35 of the bull so that the rigid transverse rod 1 is disposed in proper position by means of the chains 27, with the pain inflicting elements 3 resting upon the forehead or upper section of the front of the head of the bull. With the device so attached the vertical rod 13 extends transversely of the rigid rod 1, with the hook 15 at the upper end thereof outwardly directed, and the eye 17 is, of course, positioned below the transverse rod of the device. The chain 19 extends downwardly along the bull's face and is attached by the ring 21 to the customary nose ring 23.

Figure 2:
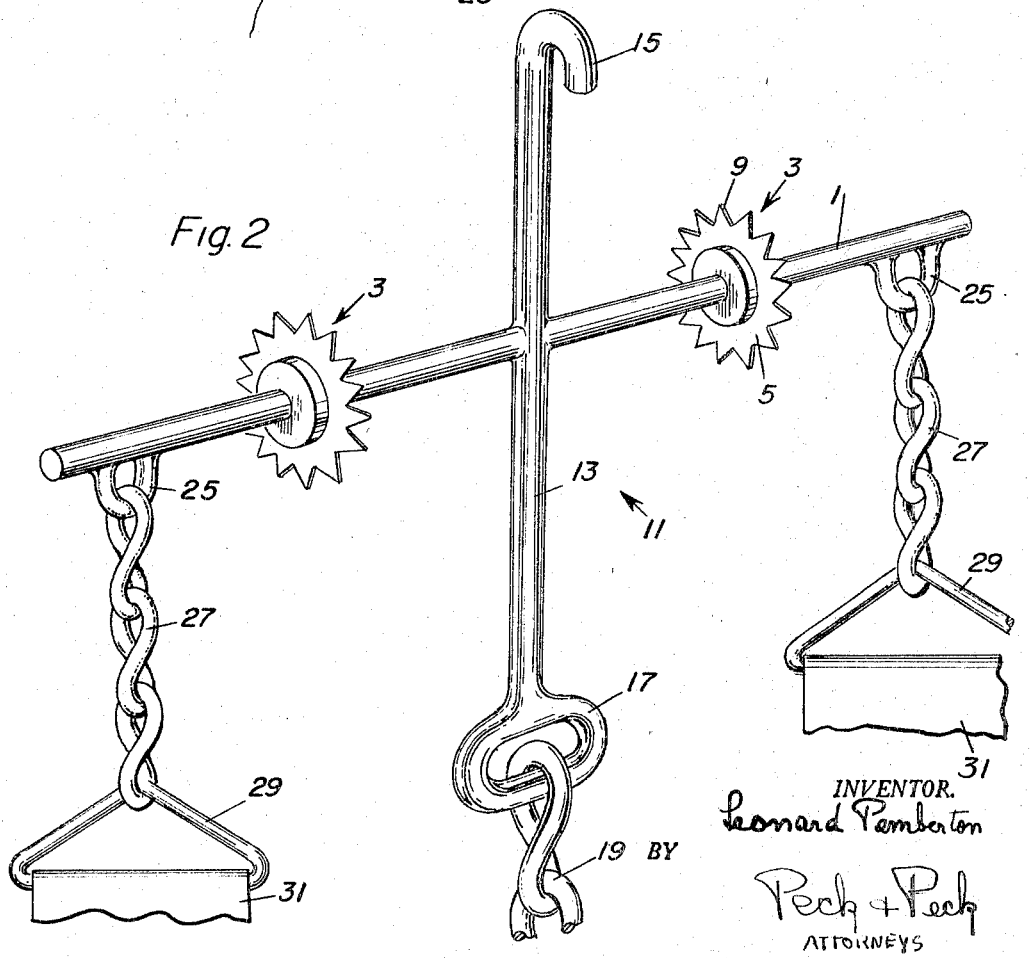
FIG. 2 is a view in perspective of the device with parts thereof broken away.

It is to be distinctly understood that my device is applicable to bulls wthout horns in the same manner as that disclosed in FIG. 2 of the drawings of my Patent No. 3,167,054.

With the improved device for preventing head butting and also preventing the bull from going through or under fences, in operative position on the bull as illustrated in FIG. 1 of the drawings, in the event that the bull engages his head with another bull, or with a relatively solid object, in a butting activity, it will be apparent that the pain inflicting elements 3 will come into play, and since the prongs or spurs 9 extend continuously about said elements and are in engagement with the bull's head, they will be pressed into his head to produce sufficient pain so that he will stop butting. Now, in the event that the bull attempts to go through or under a wire fence or the like, the hook 15 will catch on the wire of the fence and will thereby be biased rearwardly to cause the pain inflicting elements 3 to be operative, and will also produce further pain in the animal due to the fact that with the hook 15, caught upon the wire of the fence, this will not only force the pain inducing elements 3 into the bull's head, but will also cause a rocking motion of the entire device with the lower portion of the vertical rod 13 tilting upwardly to thereby pull up on the nose ring 23 in the bull's nose due to the fact that the nose ring is connected to the vertical rod by means of the chain or the like 19 to thereby cause further pain in the nose of the bull. It will now be recognized that my improved bull control device provides dual pain inflicting means, and constitutes a definite and advantageous improvement over what is disclosed in my aforesaid patent.

I claim:

A bull control device, comprising a rigid rod adapted to extend transversely across the head of a bull, pain inflicting means fixed to said rod, and said pain inflicting means being provided with circularly shaped pain inflicting elements in engagement with the head of a bull, said circularly shaped pain inflicting elements in inoperative condition being in harmless engagement with the head of the bull, a vertical rod fixed to and extending substantially perpendicularly both above and below said rigid rod and having an outwardly directed hook on the upper end thereof, pliant connecting means, the upper end of said pliant connecting means being connected to the lower end of the vertical rod and the other end of said pliant connecting means being connected to a ring in the nose of the bull, and said pliant connecting means when said pain inflicting elements are in inoperative condition loosely extending between the lower end of said vertical rod and said ring, said circularly shaped pain inflicting elements constituting bearing points so that in operative pain inflicting condition the lower end of the vertical rod will rock upwardly thereon when said hook is caught in a fence wire and thereby cause pain inflicting pressure on said pain inflicting elements and cause said pliant connecting means to become taut to thereby produce pulling pressure on said ring, and means for removably connecting said bull control device to the head of a bull.

References Cited

UNITED STATES PATENTS

| | | | |
|---|---|---|---|
| 1,469,492 | 10/1923 | Bailey | 119—142 |
| 2,254,574 | 9/1941 | Jackson | 119—142 |
| 2,295,365 | 9/1942 | Sparkman | 119—142 |
| 3,167,054 | 1/1965 | Pemberton | 119—142 |

SAMUEL KOREN, *Primary Examiner.*

HUGH R. CHAMBLEE, *Examiner.*